United States Patent
Kabacik

(10) Patent No.: US 9,893,387 B2
(45) Date of Patent: Feb. 13, 2018

(54) METHOD OF CHARGING A LITHIUM-SULPHUR CELL

(71) Applicant: Oxis Energy Limited, Oxfordshire (GB)

(72) Inventor: Lukasz Kabacik, Oxfordshire (GB)

(73) Assignee: Oxis Energy Limited, Oxfordshire (GB)

( * ) Notice: Subject to any disclaimer, the term of this patent is extended or adjusted under 35 U.S.C. 154(b) by 91 days.

(21) Appl. No.: 14/768,682

(22) PCT Filed: Mar. 21, 2014

(86) PCT No.: PCT/GB2014/050891
§ 371 (c)(1),
(2) Date: Aug. 18, 2015

(87) PCT Pub. No.: WO2014/155070
PCT Pub. Date: Oct. 2, 2014

(65) Prior Publication Data
US 2016/0006083 A1    Jan. 7, 2016

(30) Foreign Application Priority Data
Mar. 25, 2013    (EP) .................. 13160790

(51) Int. Cl.
*H02J 7/04*    (2006.01)
*H02J 7/16*    (2006.01)
(Continued)

(52) U.S. Cl.
CPC .......... *H01M 10/44* (2013.01); *H01M 4/38* (2013.01); *H01M 10/052* (2013.01);
(Continued)

(58) Field of Classification Search
USPC ................. 320/132, 134, 162, 164
See application file for complete search history.

(56) References Cited

U.S. PATENT DOCUMENTS

| 3,030,720 A | 4/1962 | Osswald et al. |
| 3,185,590 A | 5/1965 | Mayer et al. |

(Continued)

FOREIGN PATENT DOCUMENTS

| CN | 1389948 | 1/2003 |
| EP | 764489 | 3/1997 |

(Continued)

OTHER PUBLICATIONS

Jeon et al. Solvent-Free Polymer Electrolytes Based on Thermally Annealed Porous P(VdF-HFP)/P(EO-EC) Membranes.
(Continued)

*Primary Examiner* — Brian Ngo
(74) *Attorney, Agent, or Firm* — Meyertons, Hood, Kivlin, Kowert & Goetzel, P.C.; Mark R. DeLuca

(57) ABSTRACT

A method for charging a lithium-sulphur cell, said method comprising: •determining the discharge capacity, $Q_n$, of the cell during a charge-discharge cycle, n, •calculating the value of $a*Q_n$, where a=1.05 to 1.4, and, •in a later charge-discharge cycle, n+x, where x is an integer of 1 to 5, charging the cell to a capacity $Q_{n+x}$ that is equal to $a*Q_n$.

7 Claims, 1 Drawing Sheet

(51) Int. Cl.
*H01M 10/44* (2006.01)
*H01M 4/38* (2006.01)
*H01M 10/052* (2010.01)
*H02J 7/00* (2006.01)
*H01M 10/46* (2006.01)
*H01M 4/136* (2010.01)
*H01M 4/58* (2010.01)
*H01M 10/42* (2006.01)

(52) U.S. Cl.
CPC .............. *H01M 10/46* (2013.01); *H02J 7/007* (2013.01); *H02J 7/0052* (2013.01); *H02J 7/0078* (2013.01); *H01M 4/136* (2013.01); *H01M 4/382* (2013.01); *H01M 4/5815* (2013.01); *H01M 2010/4292* (2013.01)

(56) References Cited

U.S. PATENT DOCUMENTS

| | | | |
|---|---|---|---|
| 3,578,500 A | 5/1971 | Maricle et al. |
| 3,639,174 A | 2/1972 | Kegelman |
| 3,721,113 A | 3/1973 | Hovsepian |
| 3,778,310 A | 12/1973 | Garth |
| 3,877,983 A | 4/1975 | Hovsepian |
| 3,907,591 A | 9/1975 | Lauck |
| 3,907,597 A | 9/1975 | Mellors |
| 3,951,688 A | 4/1976 | Pankow et al. |
| 4,060,674 A | 11/1977 | Klemann et al. |
| 4,104,451 A | 8/1978 | Klemann et al. |
| 4,118,550 A | 10/1978 | Koch |
| 4,154,906 A | 5/1979 | Bubnick et al. |
| 4,163,829 A | 8/1979 | Kronenberg |
| 4,218,523 A | 8/1980 | Kalnoki-Kis |
| 4,252,876 A | 2/1981 | Koch |
| 4,303,748 A | 12/1981 | Armand et al. |
| 4,318,430 A | 3/1982 | Perman |
| 4,410,609 A | 10/1983 | Peled et al. |
| 4,499,161 A | 2/1985 | Foos |
| 4,503,234 A | 3/1985 | Huwiler et al. |
| 4,550,064 A | 10/1985 | Yen et al. |
| 4,690,877 A | 9/1987 | Gabano et al. |
| 4,725,927 A | 2/1988 | Morimoto et al. |
| 4,740,436 A | 4/1988 | Kobayashi et al. |
| 5,079,109 A | 1/1992 | Takami et al. |
| 5,219,684 A | 6/1993 | Wilkinson et al. |
| 5,368,958 A | 11/1994 | Hirai et al. |
| 5,460,905 A | 10/1995 | Skotheim |
| 5,462,566 A | 10/1995 | Skotheim |
| 5,523,179 A | 6/1996 | Chu |
| 5,529,860 A | 6/1996 | Skotheim et al. |
| 5,532,077 A | 7/1996 | Chu |
| 5,582,623 A | 12/1996 | Chu |
| 5,587,253 A | 12/1996 | Gozdz et al. |
| 5,648,187 A | 7/1997 | Skotheim |
| 5,744,262 A | 4/1998 | Cheng et al. |
| 5,789,108 A | 8/1998 | Chu |
| 5,797,428 A | 8/1998 | Miller |
| 5,814,420 A | 9/1998 | Chu |
| 5,919,587 A | 7/1999 | Mukherjee et al. |
| 5,961,672 A | 10/1999 | Skotheim et al. |
| 5,962,171 A | 10/1999 | Boguslavsky et al. |
| 6,030,720 A | 2/2000 | Chu et al. |
| 6,090,504 A | 7/2000 | Sung et al. |
| 6,117,590 A | 9/2000 | Skotheim et al. |
| 6,162,562 A | 12/2000 | Tsuji et al. |
| 6,174,621 B1 | 1/2001 | Skotheim et al. |
| 6,201,100 B1 | 3/2001 | Gorkovenko et al. |
| 6,210,831 B1 | 4/2001 | Gorkovenko et al. |
| 6,245,465 B1 | 6/2001 | Angell et al. |
| 6,302,928 B1 | 10/2001 | Xu et al. |
| 6,319,633 B1 | 11/2001 | Ikeda et al. |
| 6,344,293 B1 | 2/2002 | Geronov |
| 6,358,643 B1 | 3/2002 | Katz |
| 6,376,123 B1 | 4/2002 | Chu |
| 6,537,704 B1 | 3/2003 | Akashi et al. |
| 6,544,691 B1 | 4/2003 | Guidotti |
| 6,613,480 B1 | 9/2003 | Hwang et al. |
| 6,632,573 B1 | 10/2003 | Nimon et al. |
| 6,706,449 B2 | 3/2004 | Mikhaylik et al. |
| 6,733,924 B1 | 5/2004 | Skotheim et al. |
| 6,797,428 B1 | 9/2004 | Skotheim et al. |
| 7,108,942 B1 | 9/2006 | Gan et al. |
| 7,250,233 B2 | 7/2007 | Choi et al. |
| 7,335,440 B2 | 2/2008 | Aamodt et al. |
| 7,354,680 B2 | 4/2008 | Mikhaylik et al. |
| 2001/0008736 A1 | 7/2001 | Fanta et al. |
| 2002/0022181 A1 | 2/2002 | Tsujioka et al. |
| 2002/0034688 A1 | 3/2002 | Chu et al. |
| 2002/0039677 A1 | 4/2002 | Iwamoto et al. |
| 2002/0045101 A1 | 4/2002 | Hwang et al. |
| 2002/0045102 A1 | 4/2002 | Youngiu et al. |
| 2002/0102466 A1 | 8/2002 | Hwang et al. |
| 2002/0168574 A1 | 11/2002 | Ahn et al. |
| 2002/0192557 A1 | 12/2002 | Choi et al. |
| 2003/0073005 A1 | 4/2003 | Kim et al. |
| 2003/0157411 A1* | 8/2003 | Jung ................ H01M 2/1653 429/317 |
| 2003/0175596 A1 | 9/2003 | Park et al. |
| 2003/0180611 A1 | 9/2003 | Mikhaylik et al. |
| 2003/0190530 A1 | 10/2003 | Yang et al. |
| 2004/0002002 A1 | 1/2004 | Mitzuta et al. |
| 2004/0028999 A1 | 2/2004 | LaLiberte |
| 2004/0048164 A1 | 3/2004 | Jung et al. |
| 2004/0053129 A1 | 3/2004 | Jung et al. |
| 2004/0072066 A1 | 4/2004 | Cho et al. |
| 2004/0091776 A1 | 5/2004 | Hwang |
| 2004/0096750 A1 | 5/2004 | Kim et al. |
| 2004/0101753 A1 | 5/2004 | Hwang |
| 2004/0137330 A1 | 7/2004 | Lee et al. |
| 2004/0157132 A1 | 8/2004 | Kim et al. |
| 2004/0219428 A1 | 11/2004 | Nagayama |
| 2004/0222768 A1 | 11/2004 | Moore et al. |
| 2004/0258996 A1 | 12/2004 | Kim et al. |
| 2005/0136327 A1 | 6/2005 | Miyake et al. |
| 2005/0156575 A1 | 7/2005 | Mikhaylik |
| 2005/0175903 A1* | 8/2005 | Kim ................ H01M 4/02 429/246 |
| 2005/0221192 A1 | 10/2005 | Hennige et al. |
| 2005/0238956 A1 | 10/2005 | Lee |
| 2005/0244693 A1 | 11/2005 | Strutt et al. |
| 2006/0024579 A1 | 2/2006 | Kolosnitsyn et al. |
| 2006/0051643 A1 | 3/2006 | Sarkar et al. |
| 2006/0105233 A1 | 5/2006 | Morita |
| 2006/0121355 A1 | 6/2006 | Kolosnitsyn et al. |
| 2006/0177741 A1 | 8/2006 | Kolosnitsyn et al. |
| 2006/0204856 A1 | 9/2006 | Ryu et al. |
| 2006/0234126 A1 | 10/2006 | Kolosnitsyn et al. |
| 2006/0238203 A1* | 10/2006 | Kelley ................ G01R 31/3679 324/433 |
| 2006/0292451 A1 | 12/2006 | Lee et al. |
| 2007/0072076 A1 | 3/2007 | Kolosnitsyn et al. |
| 2007/0281210 A1 | 12/2007 | Kolosnitsyn et al. |
| 2008/0038645 A1 | 2/2008 | Kolosnitsyn et al. |
| 2008/0060189 A1 | 3/2008 | Daidoji et al. |
| 2008/0100264 A1 | 5/2008 | Kolosnitsyn et al. |
| 2009/0053565 A1 | 2/2009 | Iacovelli |
| 2009/0111029 A1 | 4/2009 | Lee et al. |
| 2009/0246626 A1 | 10/2009 | Tasaki et al. |
| 2009/0317717 A1 | 12/2009 | Ryu et al. |
| 2010/0129724 A1 | 5/2010 | Kolosnitsyn et al. |
| 2010/0231168 A1 | 9/2010 | Kolosnitsyn et al. |
| 2011/0059361 A1 | 3/2011 | Wilkening et al. |
| 2012/0282530 A1 | 11/2012 | Chiang et al. |
| 2012/0293114 A1 | 11/2012 | Murochi et al. |
| 2012/0315553 A1 | 12/2012 | Fuminori et al. |
| 2014/0079989 A1* | 3/2014 | Janakiraman ........... H01M 4/38 429/199 |
| 2015/0147656 A1 | 5/2015 | Kogetsu et al. |

(56) References Cited

U.S. PATENT DOCUMENTS

2015/0234014 A1\* 8/2015 Moganty ............ H01M 10/448
320/136

FOREIGN PATENT DOCUMENTS

| EP | 924783 | 6/1999 |
|---|---|---|
| EP | 710995 | 3/2001 |
| EP | 1176659 | 1/2002 |
| EP | 1178555 | 2/2002 |
| EP | 1400996 | 3/2004 |
| EP | 1420475 | 5/2004 |
| EP | 1865520 | 12/2007 |
| EP | 1962364 | 8/2008 |
| EP | 2023461 | 2/2009 |
| EP | 2026402 | 2/2009 |
| EP | 2259376 | 12/2010 |
| GB | 2084391 | 4/1982 |
| GB | 2200068 | 7/1988 |
| JP | 59194361 | 11/1984 |
| JP | 64-107467 | 4/1989 |
| JP | 01-124969 | 5/1989 |
| JP | 08069812 | 3/1996 |
| JP | 8-138742 | 5/1996 |
| JP | 08138650 | 5/1996 |
| JP | 8298229 | 11/1996 |
| JP | 8298230 | 11/1996 |
| JP | 09-027328 | 1/1997 |
| JP | 9147913 | 6/1997 |
| JP | 63-081767 | 4/1998 |
| JP | 10284076 | 10/1998 |
| JP | 11-273729 | 10/1999 |
| JP | 2001-167751 | 6/2001 |
| JP | 2001167751 | 6/2001 |
| JP | 2002-75446 | 3/2002 |
| JP | 2005-071641 | 3/2005 |
| JP | 2005-108724 | 4/2005 |
| JP | 2005-005215 | 6/2005 |
| JP | 2005-243342 | 9/2005 |
| JP | 2006134785 | 5/2006 |
| JP | 2009-087728 | 4/2009 |
| JP | 2011108469 | 6/2011 |
| JP | 2011-192574 | 9/2011 |
| KR | 10-2002-0089134 | 11/2002 |
| KR | 10-0368753 | 4/2003 |
| KR | 10-2003-0056497 | 7/2003 |
| KR | 10-2011-0024707 | 3/2011 |
| WO | 2001-047088 | 6/2001 |
| WO | 197304 | 12/2001 |
| WO | 2002-095849 | 11/2002 |
| WO | 2004021475 | 3/2004 |
| WO | 2006-050117 | 5/2006 |
| WO | 2007-111988 | 10/2007 |
| WO | 2007-132994 | 11/2007 |

OTHER PUBLICATIONS

Suo et al. "A New Class of Solvent-in-Salt Electrolyte for High-Energy Rechargeable Metallic Lithium Batteries" Nature Communications, 2013, vol. 4, p. 1481.
UK Search Report, Application No. GB 0416708.6, Section 17, dated Aug. 10, 2004.
UK Search Report, Application No. GB 0501001.2, dated Apr. 14, 2005.
Japanese Office Action for JP Application No. 2007-550839 dated Apr. 1, 2014.
Korean Office Action for Application No. 10-2013-7031637, dated Jan. 27, 2014.
International Search Report, Application No. PCT/GB2005/002850, dated Aug. 25, 2005.
Written Opinion, Application No. PCT/GB2005/002850, dated Aug. 25, 2005.
International Preliminary Report on Patentability, Application No. PCT/GB2005/002850, dated Jan. 30, 2007.
International Search Report, Application No. PCT/GB2006/000103, dated Jun. 20, 2007.
Written Opinion, Application No. PCT/GB2006/000103, dated Jun. 20, 2007.
International Preliminary Report on Patentability, Application No. PCT/GB2006/000103, dated Jul. 24, 2007.
International Search Report, Application No. PCT/GB2006/050300, dated Dec. 6, 2006.
Written Opinion, Application No. PCT/GB2006/050300, dated Dec. 6, 2006.
International Preliminary Report on Patentability, Application No. PCT/GB2006/050300, dated Mar. 26, 2008.
International Search Report, PCT Application No. PCT/GB2012/051633, dated Feb. 1, 2013.
Written Opinion, PCT Application No. PCT/GB2012/051633, dated Feb. 1, 2013.
International Preliminary Report on Patentability, PCT Application No. PCT/GB2012/051633, dated Jun. 17, 2014.
International Search Report, PCT Application No. PCT/GB2012/052728, dated Jan. 2, 2013.
Written Opinion, PCT Application No. PCT/GB2012/052728, dated Jan. 2, 2013.
International Preliminary Report on Patentability, PCT Application No. PCT/GB2012/052728, dated Aug. 19, 2014.
International Search Report, Application No. PCT/GB2014/05088, dated Jul. 7, 2014.
Written Opinion, Application No. PCT/GB2014/05088, dated Jul. 7, 2014.
International Preliminary Report on Patentability, Application No. PCT/GB2014/050888, dated Sep. 29, 2015.
International Search Report, Application No. PCT/GB2014/050890, dated Jun. 2, 2014.
Written Opinion, Application No. PCT/GB2014/050890, dated Jun. 2, 2014.
International Preliminary Report on Patentability, Application No. PCT/GB2014/050890, dated Sep. 29, 2015.
International Search Report, Application No. PCT/GB2014/050891, dated Jul. 24, 2014.
Written Opinion, Application No. PCT/GB2014/050891, dated Jul. 24, 2014.
International Preliminary Report on Patentability, Application No. PCT/GB2014/050891, dated Sep. 29, 2015.
International Search Report, Application No. PCT/GB2014/052474, dated Nov. 5, 2014.
Written Opinion, Application No. PCT/GB2014/052474, dated Nov. 5, 2014.
International Preliminary Report on Patentability, Application No. PCT/GB2014/052474, dated Feb. 16, 2016.
International Search Report, Application No. PCT/GB2014/053715, dated Feb. 27, 2015.
Written Opinion, Application No. PCT/GB2014/053715, dated Feb. 27, 2015.
International Preliminary Report on Patentability, Application No. PCT/GB2014/053715, dated Jun. 21, 2016.
International Search Report, Application No. PCT/GB2014/053719, dated Feb. 24, 2015.
Written Opinion, Application No. PCT/GB2014/053719, dated Feb. 24, 2015.
International Preliminary Report on Patentability, Application No. PCT/GB2014/053719, dated Jun. 21, 2016.
Cowie et al. "Ion Conduction in Macroporous Polyethylene Film Doped With Electrolytes" Solid State Ionics 109 (1998) 139-144.
U.S. Appl. No. 12/527,701, filed Jun. 18, 2009, Kolosnitsyn et al.
U.S. Appl. No. 11/190,203, filed Jul. 27, 2005, Kolosnitsyn et al.
U.S. Appl. No. 11/332,471, filed Jan. 17, 2006, Kolosnitsyn et al.
U.S. Appl. No. 11/386,113, filed Mar. 22, 2006, Kolosnitsyn et al.
U.S. Appl. No. 60/721,062, filed Sep. 28, 2005, Kolosnitsyn et al.
Bates et al., "Solvent Effects on Acid-Base Behavior: Five Uncharged Acids in Water-Sulfolane Solvents", 1976, Journal of Solution Chemistry, vol. 5, No. 3, p. 213-222.
Definitions of "slurry" and "suspension", Merriam Webster's, Collegiate Dictionary (10th Edition), printed Feb. 4, 2008.

(56) References Cited

OTHER PUBLICATIONS

Komaba et al., "Inorganic Electrolyte Additives to Supress the Degradation of Graphite Anodes by Dissolved Mn(II) for Lithium Ion Batteries", Mar. 2003, Journal of Power Sources, 1190121, p. 378-382.

Chagnes et al., "Butyrolactone-Ethylene Carbonate Based Electrolytes for Lithium Ion Batteries", Jul. 2003, Journal of Applied Electrochemistry, 33, p. 589-595.

Yamin H., Peled E, "Electrochemistry of a Nonaqueous Lithium/Sulphur Cell", J of Power Sources, 1983, vol. 9, p. 281-287.

D. Aurbach, E. Zinigrad, Y. Cohen, H. Teller, "A Short Review of Failure Mechanisms of Lithium Metal and Lithiated Graphite Anodes in Liquid Electrolyte Solutions", Solid State Ionics, 2002, vol. 148, p. 405-416.

Duck-Rye Chang, Suck-Hyun Lee, Sun-Wook Kim, Hee-Tak Kim, "Binary Electrolyte Based on Tetra (ethylene glycol) Dimethyl Ether and 1,3-dioxolane for Lithium-Sulphur Battery", J. Power Sources, 2002, vol. 112, p. 452-460.

Yamin H., Penciner J., Gorenshtein A., Elam M., Peled E., "The Electrochemical Behavior of Polysulphides in Tetrahydrofuran", J. of Power Sources, 1985, vol. 14, p. 129-134.

Yamin H., Gorenshtein A., Penciner J., Sternberg Y., Peled E., "Lithium Sulphur Battery Oxidation/Reduction Mechanisms of Polysulphides in THF Solution", J. Electrochem Soc. 1988, vol. 135, No. 5, p. 1045-1048.

J. Paris, V. Plichon, "Electrochemical Reduction of Sulphur in Dimethylacetamide", Electrochimica Acta, 1981, vol. 26, No. 12, p. 1823-1829.

Levillain E., Gaillard F., Leghie P., Demortier A., Lelieu J.P., "On the Understanding of the Reduction of Sulphur (S8) in Dimethylformamide (DMF)", J. of Electroanalytical Chemistry, 1997, vol. 420, p. 167-177.

Peled E., Gorenshrein A., Segal M., Sternberg Y, "Rechargeable Lithium-Sulphur Battery (extended abstract)", J. of Power Sources, 1989, vol. 26, p. 269-271.

Peled E., Sternberg Y., Gorenshtein A., Lavi Y., "Lithium-Sulphur Battery: Evaluation of Dioxolane-Based Electrolytes", J. Electrochem Soc., 1989, vol. 136, No. 6, p. 1621-1625.

Rauh R.D. Abraham K.M., Pearson G.F., Surprenant J.K., Brummer S.B., "A Lithium/Dissolved Sulphur Battery with an Organic Electrolyte", J. Electrochem Soc., 1979, vol. 126, No. 4, p. 523-527.

Rauh R.D., Shuker F.S., Marston J.M., Brummer S.B., "Formation of Lithium Polysulphides in Aprotic Media", J. inorg. Nucl Chem, 1977, vol. 39, p. 1761-1766.

Shin-Ichi Tobishima, Hideo Yamamoto, Minoru Matsuda, "Study on the Reduction Species of Sulfur by Alkali Metals in Nonaqueous Solvents", Electrochimica Acta, 1997, vol. 42, No. 6, p. 1019-1029.

Taitiro Fujinaga, Tooru Kuwamoto, Satoshi Okazaki, Masashi Horo, "Electrochemical Reduction of Elemental Sulphur in Acetonitrile", Bull Chem. Soc. Jpn. 1980, vol. 53, p. 2851-2855.

Gholam-Abbas Nazri, Gianfranco Pistoia, "Lithium Batteries: Science and Technology", 2003, p. 509-573, Hardcover, ISBN: 978-1-4020-7628-2.

Office Action, U.S. Appl. No. 11/290,825, dated Jun. 11, 2009.
Office Action, U.S. Appl. No. 11/526,876, dated Oct. 30, 2009.
Office Action, U.S. Appl. No. 11/190,203, dated Oct. 9, 2009.
Office Action, U.S. Appl. No. 11/190,203, dated Apr. 3, 2009.
Office Action, U.S. Appl. No. 11/332,471, dated Jul. 31, 2009.
Office Action, U.S. Appl. No. 11/332,471, dated Feb. 26, 2009.
Office Action, U.S. Appl. No. 11/332,471, dated Aug. 27, 2008.
Office Action, U.S. Appl. No. 11/332,471, dated Sep. 28, 2007.
Office Action, U.S. Appl. No. 11/332,471, dated Mar. 11, 2008.
Office Action, U.S. Appl. No. 11/332,471, dated Feb. 20, 2007.
Office Action, U.S. Appl. No. 11/332,471, dated Aug. 21, 2007.
Office Action, U.S. Appl. No. 11/386,113, dated Jan. 6, 2009.
Office Action, U.S. Appl. No. 11/386,113, dated Aug. 19, 2008.
Office Action, U.S. Appl. No. 11/386,113, dated Feb. 5, 2008.
Notice of Allowance, U.S. Appl. No. 11/386,113, dated Jul. 24, 2009.
Office Action, U.S. Appl. No. 11/889,334, dated Aug. 14, 2009.

"Transportation Regulations for Lithium, Lithium Ion and Polymer Cells and Batteries", Ultralife Batteries, Inc. Rev. H, Dec. 18, 2003.

V.S. Kolosnitsyn, L.V. Sheina and S.E. Mochalov, "Physicochemical and Electrochemical Properties of Sulfolane Solutions of Lithium Salts", May 2008, p. 575-578, MAIK Nauka/Interperiodica distributed exclusively by Springer Science+Business Media, LLC.

\* cited by examiner

METHOD OF CHARGING A LITHIUM-SULPHUR CELL

The present invention relates to a method of charging a lithium-sulphur battery. The present invention also relates to a battery management system for charging a lithium-sulphur battery.

BACKGROUND

A typical lithium-sulphur cell comprises an anode (negative electrode) formed from lithium metal or a lithium metal alloy, and a cathode (positive electrode) formed from elemental sulphur or other electroactive sulphur material. The sulphur or other electroactive sulphur-containing material may be mixed with an electrically conductive material, such as carbon, to improve its electrical conductivity. Typically, the carbon and sulphur are ground and then mixed with solvent and binder to form a slurry. The slurry is applied to a current collector and then dried to remove the solvent. The resulting structure is calendared to form a composite structure, which is cut into the desired shape to form a cathode. A separator is placed on the cathode and a lithium anode placed on the separator. Electrolyte is then introduced into the assembled cell to wet the cathode and separator.

Lithium-sulphur cells are secondary cells and may be recharged by applying an external current to the cell. Typically, the cell is charged to a fixed cut-off voltage of, for example, 2.45-2.8V. However, with repeated cycling over an extended period, the capacity of the cell may fade. Accordingly, by repeatedly charging the cell to the selected cut-off voltage, the cell may eventually be repeatedly over-charged. This can have a detrimental effect on the longevity of the cell, as undesirable chemical reactions may take lead to damage to, for example, the cell's electrodes and/or electrolytes.

A method for terminating the charging of a lithium-sulphur cell is described in WO 2007/111988. Specifically, this reference describes adding an N—O additive, such as lithium nitrate, to the electrolyte of the cell. According to the passage at page 16, lines 29 to 31, of this reference, the additive is effective in providing a charge profile with a sharp increase in voltage at the point of full charge. Accordingly, if the cell voltage during charge is monitored, charging can be terminated once a rapid increase in voltage is observed.

The method of WO 2007/111988 relies on the voltage of the cell increasing sharply as the cell reaches full capacity. Not all lithium-sulphur cells, however, exhibit such a charging profile.

BRIEF DESCRIPTION OF THE DRAWINGS

Advantages of the present invention will become apparent to those skilled in the art with the benefit of the following detailed description of embodiments and upon reference to the accompanying drawings in which.

SUMMARY OF THE INVENTION

Figure 1:
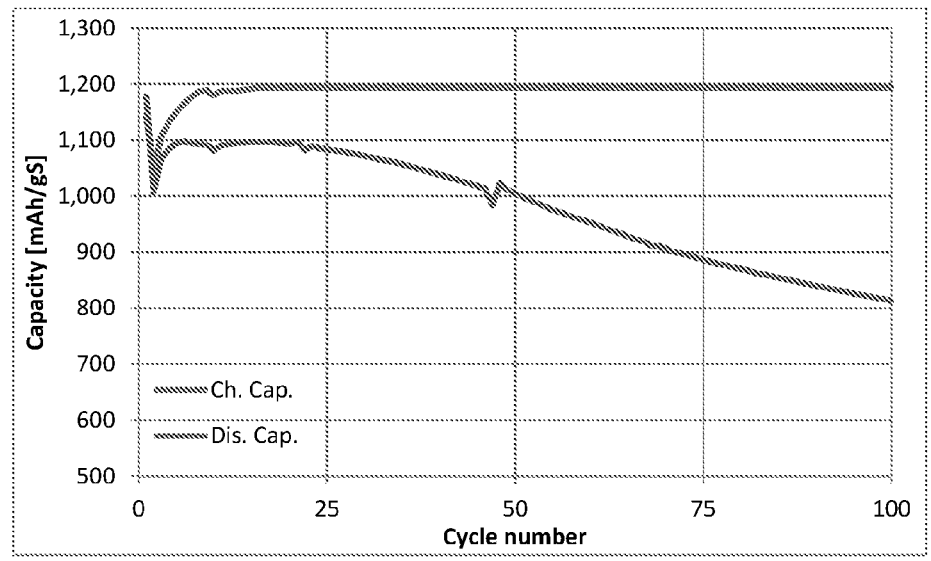
FIG. 1 depicts a graph of the capacity of a lithium-sulphur cell charged to a fixed capacity for 100 cycles.

According to the present invention, there is provided a method of charging of a lithium-sulphur electrochemical cell, said method comprising:

determining the discharge capacity, $Q_n$, of the cell during a charge-discharge cycle n, calculating the value of $a \cdot Q_n$, where a=1.1 to 1.3, and, in a later charge-discharge cycle, n+x, where x is an integer of 1 to 5, charging the cell to a capacity, $Q_{n+x}$, that is equal to $a \cdot Q_n$.

Preferably, x is 1, 2 or 3, more preferably, 1 or 2, and most preferably 1. In a preferred embodiment, therefore, the cell is charged to a capacity that is determined as a function of the discharge capacity of the preceding cycle.

Preferably, a is a value selected from 1.1 to 1.2.

In a preferred embodiment, x is 1 or 2, preferably 1, and a is 1.1 to 1.2.

In the method of the present invention, the charge capacity of the cell is determined on the basis of the discharge capacity of an earlier (preferably the preceding) cycle. Because the discharge capacity of the cell is monitored, the cell can be charged to a level dependent on the number of charge-discharge cycles that the cell has undergone. In this way, the cell can be charged in such a way as to avoid or reduce the risk of over-charging as a result of capacity fade. By reducing the risk of over-charging, the risk of capacity fade may also be reduced. Advantageously, this can improve the longevity of the overall cell. This contrasts with conventional methods of charging a lithium sulphur cell where the cell is charged to a pre-determined voltage or capacity irrespective of the extent to which the cell has experienced capacity fade.

In one embodiment, the method of the present invention is applied from the first discharge cycle of the cell. In other words, the discharge capacity $Q_n$ is the beginning of life discharge capacity ($Q_{bol}$) of the cell. In an alternative embodiment, the method of the present invention is applied after the cell has been charged more than once. In one embodiment, the method may be applied after signs of capacity fade are observed, for example, after 5 or more cycles of the cell. In one embodiment, the method of the present invention is applied after 10 or more cycles of the cell. Prior to implementing the method of the present invention, the cell may be charged using a different method, for example, by charging the cell to a fixed, pre-determined voltage using a constant current.

In one embodiment, the method additionally comprises the step of determining a threshold discharge capacity, $Q_t$, of the cell. This threshold discharge capacity may be the discharge capacity of the cell during an early cycle in the life of the cell, for example, before any appreciable signs of capacity fade are observed. This may be the discharge capacity at the $5^{th}$ cycle or sooner, for example, at the $4^{th}$, $3^{rd}$, $2^{nd}$ or $1^{st}$ cycle. In one embodiment, this may be the capacity of the cell during its first discharge cycle following cell assembly (i.e. the beginning of life discharge capacity, $Q_{bol}$, or the discharge capacity at the first cycle). In a preferred embodiment, the threshold discharge capacity is the discharge capacity of the cell at the $1^{st}$ or $2^{nd}$ cycle.

Once the threshold discharge capacity is determined, the discharge capacity, Q, of the cell in subsequent discharge cycles is monitored. When the discharge capacity of the cell, $Q_m$, falls below 0.8 $Q_t$ (e.g. below 0.7 $Q_t$ or below 0.6 $Q_t$), the cell may be charged to (i) $b \cdot Q_t$, where b is 1.05 to 1.3, or to (ii) 2.45V, whichever is lower. Where the cell is charged to $b \cdot Q_t$, b is preferably 1.1 to 1.2, more preferably about 1.1. By charging the cell according to steps (i) or (ii) above once the discharge capacity of the cell falls below 0.8 $Q_t$, the cell may be given a charging boost, converting a greater proportion of the short chain polysulphides to longer chain polysulphides. This can reduce the rate of subsequent losses in capacity due to undercharging of the cell.

Once the cell is charged according to steps (i) or (ii) above, the discharge capacity of the subsequent cycle is $Q_{m+1}$. The charge capacity for the $Q_{m+2}$ cycle is preferably $a \cdot Q_{m+1}$, wherein a is 1.1 to 1.3, preferably 1.1 to 1.2. The charge capacity of subsequent cycles may be based on the discharge capacity of the preceding cycle in this way until the discharge capacity of the cell once again falls below 0.8 $Q_{tl}$ (e.g. below 0.7 $Q_t$ or 0.6 $Q_t$). At this point, steps (i) or (ii) may be repeated.

The present invention also provides a battery management system for carrying out the method described above. In a further aspect, the present invention provides a battery management system for a lithium-sulphur battery, said system comprising:

means for determining the discharge capacity, $Q_n$, of the cell during a charge-discharge cycle (n), means for calculating the value of $a \cdot Q_n$, where a=1.1 to 1.3, and, means for charging the cell to a capacity $Q_{n+x}$, that is equal to $a \cdot Q_n$ in a later charge-discharge cycle, n+x, where x is an integer of 1 to 5.

The system may additionally include means for coupling the system to a lithium-sulphur battery. In one embodiment, the system includes a lithium sulphur battery.

In a preferred embodiment, the lithium-sulphur cell is charged by supplying electric energy at constant current. The current may be supplied so as to charge the cell in a time ranging from 30 minutes to 12 hours, preferably 8 to 10 hours. The current may be supplied at a current density ranging from 0.1 to 3 mA/cm$^2$, preferably 0.1 to 0.3 mA/cm$^2$. As an alternative to charging at a constant current, it may also be possible to charge the lithium-sulphur cell to a constant voltage until the relevant capacity is reached. Suitable voltages range from 2.35V to 2.8V The electrochemical cell may be any suitable lithium-sulphur cell. The cell typically includes an anode, a cathode, and an electrolyte. Advantageously, a porous separator may be positioned between the anode and cathode. The anode may be formed of lithium metal or a lithium metal alloy. Preferably, the anode is a metal foil electrode, such as a lithium foil electrode. The lithium foil may be formed of lithium metal or lithium metal alloy.

The cathode of the electrochemical cell includes a mixture of electroactive sulphur material and electroconductive material. This mixture forms an electroactive layer, which may be placed in contact with a current collector.

The mixture of electroactive sulphur material and electroconductive material may be applied to the current collector in the form of a slurry in an organic solvent (e.g. water or an organic solvent). The solvent may then be removed and the resulting structure calendared to form a composite structure, which may be cut into the desired shape to form a cathode. A separator may be placed on the cathode and a lithium anode placed on the separator. Electrolyte may then be introduced into the assembled cell to wet the cathode and separator.

The electroactive sulphur material may comprise elemental sulphur, sulphur-based organic compounds, sulphur-based inorganic compounds and sulphur-containing polymers. Preferably, elemental sulphur is used.

The solid electroconductive material may be any suitable conductive material. Preferably, this solid electroconductive material may be formed of carbon. Examples include carbon black, carbon fibre and carbon nanotubes. Other suitable materials include metal (e.g. flakes, filings and powders) and conductive polymers. Preferably, carbon black is employed.

The weight ratio of electroactive sulphur material (e.g. elemental sulphur) to electroconductive material (e.g. carbon) may be 1 to 30:1; preferably 2 to 8:1, more preferably 5 to 7:1.

The mixture of electroactive sulphur material and electroconductive material may be a particulate mixture. The mixture may have an average particle size of 50 nm to 20 microns, preferably 100 nm to 5 microns.

The mixture of electroactive sulphur material and electroconductive material (i.e. the electroactive layer) may optionally include a binder. Suitable binders may be formed from at least one of, for example, polyethylene oxide, polytetrafluoroethylene, polyvinylidene fluoride, ethylene-propylene-diene rubber, methacrylate (e.g. UV-curable methacrylate), and divinyl esters (e.g. heat curable divinyl esters).

As discussed above, the cathode of the electrochemical cell may further comprise a current collector in contact with the mixture of electroactive sulphur material and solid electroconductive material. For example, the mixture of electroactive sulphur material and solid electroconductive material is deposited on the current collector. A separator is also disposed between the anode and the cathode of the electrochemical cell. For example, the separator may be in contact with the mixture of electroactive sulphur material and solid electroconductive material, which, in turn, is in contact with the current collector.

Suitable current collectors include metal substrates, such as foil, sheet or mesh formed of a metal or metal alloy. In a preferred embodiment, the current collector is aluminium foil.

The separator may be any suitable porous substrate that allows ions to move between the electrodes of the cell. The porosity of the substrate should be at least 30%, preferably at least 50%, for example, above 60%. Suitable separators include a mesh formed of a polymeric material. Suitable polymers include polypropylene, nylon and polyethylene. Non-woven polypropylene is particularly preferred. It is possible for a multi-layered separator to be employed.

Preferably, the electrolyte comprises at least one lithium salt and at least one organic solvent. Suitable lithium salts include at least one of lithium hexafluorophosphate (LiPF$_6$), lithium hexafluoroarsenate (LiAsF$_6$), lithium perchlorate (LiClO$_4$), lithium trifluoromethanesulfonimide (LiN(CF$_3$SO$_2$)$_2$)), lithium borofluoride and lithium trifluoromethanesulphonate (CF$_3$SO$_3$Li). Preferably the lithium salt is lithium trifluoromethanesulphonate.

Suitable organic solvents are tetrahydrofurane, 2-methyl-tetrahydrofurane, dimethylcarbonate, diethylcarbonate, ethylmethylcarbonate, methylpropylcarbonate, methylpropylpropionate, ethylpropylpropionate, methyl acetate, dimethoxyethane, 1, 3-dioxolane, diglyme (2-methoxyethyl ether), tetraglyme, ethylene carbonate, propylene carbonate, γ-butyrolactone, dioxolane, hexamethyl phosphoamide, pyridine, dimethyl sulfoxide, tributyl phosphate, trimethyl phosphate, N, N, N, N-tetraethyl sulfamide, and sulfone and their mixtures. Preferably, the organic solvent is a sulfone or a mixture of sulfones. Examples of sulfones are dimethyl sulfone and sulfolane. Sulfolane may be employed as the sole solvent or in combination, for example, with other sulfones.

The organic solvent used in the electrolyte should be capable of dissolving the polysulphide species, for example, of the formula $S_n^{2-}$, where n=2 to 12, that are formed when the electroactive sulphur material is reduced during discharge of the cell.

The concentration of lithium salt in the electrolyte is preferably 0.1 to 5M, more preferably 0.5 to 3M, for example, 1M. The lithium salt is preferably present at a concentration that is at least 70%, preferably at least 80%, more preferably at least 90%, for example, 95 to 99% of saturation.

In one embodiment, the electrolyte comprises lithium trifluoromethanesulphonate and sulfolane.

The weight ratio of electrolyte to the total amount of electroactive sulphur material and electroconductive material is 1-15:1; preferably 2-9:1, more preferably 6-8:1.

Comparative Example 1

In this example, a lithium-sulphur cell is charged to a fixed voltage over 200+ cycles. FIG. 1 shows the charge and discharge capacity curves over the life of the cell. As can be seen from the Figure, capacity fades with increasing cycle life.

Example 2

Figure 2:
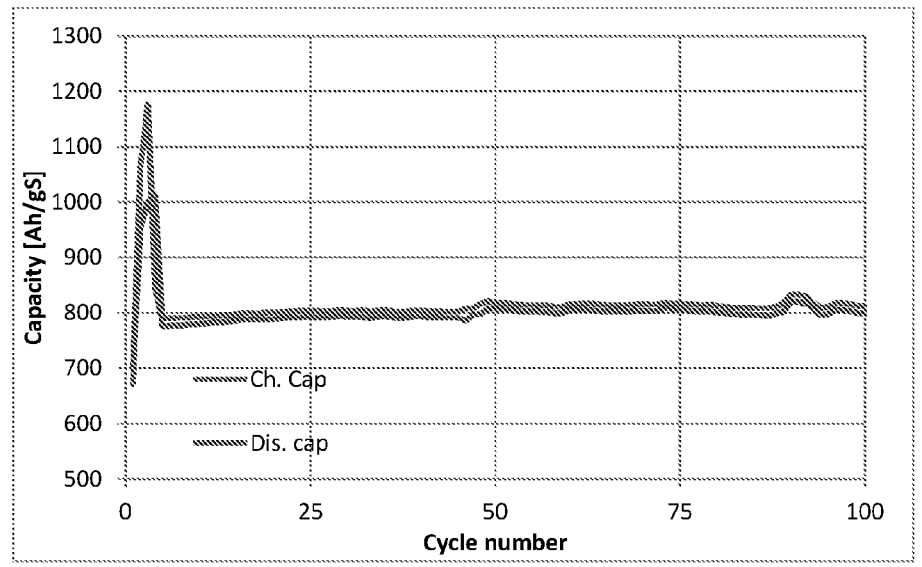
FIG. 2 depicts a graph of the capacity of a lithium-sulphur cell charged at a variable capacity for 100 cycles.

In this Example, a lithium-sulphur cell is charged to a fixed voltage until initial signs of capacity fade are observed at the end of cycle 15. The discharge capacity at cycle 15, $Q_{15}$ is determined and, at cycle 16, the cell is charged to a capacity that is $a \cdot Q_{15}$, where a=1.10. The discharge capacity at cycle 16, $Q_{16}$, is then determined and, at cycle 17, the cell is charged to $a \cdot Q_{16}$ and so on. As can be seen in FIG. 2, the rate of capacity fade is reduced by using this charging method.

The invention claimed is:

1. A method for charging a lithium-sulphur cell, said method comprising:
   coupling the lithium-sulphur cell to a battery management system, wherein the battery management system comprises a means for charging the cell, and a means for determining the discharge capacity,
   wherein the discharge capacity is determined by:
      determining the discharge capacity, $Q_n$, of the lithium-sulphur cell during a charge-discharge cycle, n,
      calculating the value of $a*Q_n$, where a=1.05 to 1.4, and, in a later charge-discharge cycle, n+x, where x is an integer of 1 to 5, charging the lithium-sulphur cell to a discharge capacity, $Q_{n+x}$, that is equal to $a*Q_n$
      determining a threshold discharge capacity, $Q_t$, of the cell, wherein the threshold capacity is the discharge capacity at the 5th cycle or sooner, and
      when the discharge capacity of the cell, $Q_m$, falls below 0.8 $Q_t$, charging the cell to (i) b*Qt, when b is 1.05 to 1.3, or to (ii) 2.45V, whichever is lower.

2. The method of claim 1, wherein x is an integer selected from 1, 2 or 3.

3. The method of claim 1, wherein x is 1.

4. The method of claim 1, wherein a is a value selected from 1.1 to 1.3.

5. The method of claim 1, wherein a is selected from 1.1 to 1.2.

6. The method of claim 1, wherein the threshold capacity of the lithium-sulphur cell is the capacity during its first discharge cycle.

7. The method of claim 1, wherein b is 1.1 to 1.2.

* * * * *